United States Patent
Griffin et al.

(10) Patent No.: US 6,442,714 B1
(45) Date of Patent: Aug. 27, 2002

(54) WEB-BASED INTEGRATED TESTING AND REPORTING SYSTEM

(75) Inventors: Andrew Griffin, Los Gatos; Daniel Paul Teeter, Mountain View; Shannon Rae Smith, San Jose, all of CA (US)

(73) Assignee: Cisco Technology, San Jose, CA (US)

( * ) Notice: Subject to any disclaimer, the term of this patent is extended or adjusted under 35 U.S.C. 154(b) by 0 days.

(21) Appl. No.: 09/271,016

(22) Filed: Mar. 17, 1999

(51) Int. Cl.[7] .............................................. G06F 11/00
(52) U.S. Cl. ........................ 714/46; 434/350; 345/714; 707/506
(58) Field of Search ................................ 702/182, 183, 702/81; 714/46, 38; 707/506, 507, 4; 345/708, 714; 434/350

(56) References Cited

U.S. PATENT DOCUMENTS

| | | | |
|---|---|---|---|
| 5,671,351 A | 9/1997 | Wild | 714/38 |
| 5,701,400 A | 12/1997 | Amado | 706/45 |
| 5,896,494 A | 4/1999 | Perugini | 714/27 |
| 6,115,643 A | 9/2000 | Stine | 700/110 |
| 6,167,352 A | 12/2000 | Kanevsky | 702/81 |
| 6,182,245 B1 | 1/2001 | Akin | 714/38 |
| 6,192,511 B1 | 2/2001 | Johnston | 717/4 |
| 6,219,626 B1 | 4/2001 | Steinmetz | 702/183 |
| 6,239,802 B1 | 5/2001 | Lahey | 345/352 |
| 6,263,456 B1 * | 7/2001 | Boxall et al. | 709/217 |
| 6,269,276 B1 * | 7/2001 | Akhavan et al. | 700/17 |
| 6,272,506 B1 * | 8/2001 | Bell | 707/505 |
| 6,286,131 B1 | 9/2001 | Beers | 717/4 |
| 6,334,096 B1 * | 12/2001 | Hiroshige et al. | 702/182 |
| 2001/0012986 A1 | 8/2001 | Conan | 702/188 |

* cited by examiner

Primary Examiner—Robert Beausoleil
Assistant Examiner—Bryce P Bonzo
(74) Attorney, Agent, or Firm—Marger, Johnson & McCollom, PC

(57) ABSTRACT

A centralized product testing system and method for its operation are disclosed. The system has a test application server that communicates with remote users as a web-based application. Equipment testers login to the system through their web browser. They can then run tests while viewing instructions for the test and entering results in dynamically-generated web browser forms tailored to their test. Completed forms (including files generated by test equipment tied to a tester's computer) can then be uploaded to the testing system. The testing system relates the test data to the product under test and stores the data in a relational database. The test data can then be used to dynamically generate preliminary or formal test reports for compliance and other purposes.

The system has many benefits. For example, because test procedures, data, and report forms are all centrally stored, they can be reliably maintained and quickly updated. Each user need only have a working web browser in order to be walked through a complicated testing process. The system reduces errors and greatly decreases effort as compared to a manual system where each tester must create report documents individually and manually.

25 Claims, 6 Drawing Sheets

WEB-BASED INTEGRATED TESTING AND REPORTING SYSTEM

FIELD OF THE INVENTION

This invention pertains to testing covering product compliance.

BACKGROUND OF THE INVENTION

Many products must comply with standards and/or regulations. For example, electronic computing equipment must meet a variety of electrical safety standards, electromagnetic interference standards, and equipment compatibility standards.

Compliance with standards generally involves subjecting one or more representative prototypes and/or product samples to a battery of standardized testing conditions. A test engineer administers each test and records the results, e.g., by filling in the blanks in a word processing document. After the tests are complete, the recorded results from one or more tests are re-entered into a final report that meets the requirements of the organization for whom the report is prepared.

Compliance testing has traditionally been a time-consuming process. Testers must have a mastery of the current applicable standards and testing procedures. The tester (or someone else charged with preparing a report) must also have a mastery of procedures and formats for report preparation, and be able to compile sometimes voluminous testing data into a report without error. After tests are complete, preparation of a typical final report can take weeks.

SUMMARY OF THE INVENTION

In addition to the problems with traditional testing identified above, today's fast-paced global market has complicated the testing puzzle. Now many products must meet standards in different countries, each requiring a separate report in a separate report format. Short product life-cycles make compliance testing delays costly, and place a demanding load on test personnel.

In contrast to the traditional distributed and highly manual compliance testing process, the present invention involves a centralized testing system (although the testers themselves may remain distributed). In one embodiment, a central electronic repository houses information on testing procedures and equipment, test data log formats, and report formats. A relational database is configured to store and retrieve test data related to multiple products. A test application server coordinates the central electronic repository and the database with a web server application, allowing remote users to use their web browsers to select a test, view and follow test procedures tailored for their equipment and their test, upload results from the test into the relational database, automatically view those results, and create different types of final reports from those results with a few keystrokes on their computer.

The present invention has many advantages when compared to traditional compliance testing. It guides users through a complicated testing process using a familiar web-browser environment. It provides users with links to detailed instructions and standards that further aid a user in performing high-quality tests. It allows users to directly upload data from computer-connected test equipment into the relational database, thus saving time and eliminating manual errors. It can check for missing and erroneous test data entries and prompt a user accordingly. It allows multiple testers to easily integrate their results, and other users to view these results. It automatically generates final reports in any of a number of selected formats using the data in the relational database. Finally, test procedures, testing templates, and report templates are all centrally maintained, creating a highly standardized process that can be quickly and reliably expanded and revised.

In a first aspect of the invention, a centralized product testing system is disclosed. The system comprises a relational database for storing test data related to multiple products. It further comprises a central electronic repository for storing test templates and report templates in electronic form. It also comprises a test application server that allows a remote user with a web browser to access the testing system. The server has the capability to store test data entered by the user on web-browser compatible testing forms into the relational database. The server also has the capability to dynamically generate product test reports in multiple selectable report formats, based on report templates from the central electronic repository and on selected stored test data. Preferably, the test application server comprises a test form generator that dynamically produces web-browser compatible test forms based on user input supplied on other web-browser compatible forms, test templates from the central electronic repository, and test data from the relational database.

In another aspect of the invention, a method of automating product testing and reporting is disclosed. In this method, a user is guided through a testing process by a series of dynamically-generated test-specific web-browser compatible test forms. Test results are accepted from a user as indicated by the user on the test forms. The test results are parsed into a relational database.

In yet another aspect of the invention, a related method of automating product testing and reporting is disclosed. In this method, test data from multiple test locations is gathered to a central test application server by supplying dynamically generated web-browser test forms from the central server to testers at the test locations and accepting test data indicated on the web-browser test forms by the testers. The accepted test data is stored in a central relational database. User requests for product test reports are then filled by locating test data for that product in the central relational database and filling a report template using that test data.

BRIEF DESCRIPTION OF THE DRAWING

The invention may be best understood by reading the disclosure with reference to the drawing, wherein.

DETAILED DESCRIPTION OF THE PREFERRED EMBODIMENTS

The invention is described below with reference to a specific implementation that uses database Structured Query Language (SQL) for database manipulations, Hypertext Markup Language (HTML) for web browser communications, and Practical Extraction and Report Language (Perl) for most other system tasks. Those skilled in the art will recognize that alternate ways of implementing the described features are possible with these languages, as well as with other software languages.

System Configuration

Figure 1:
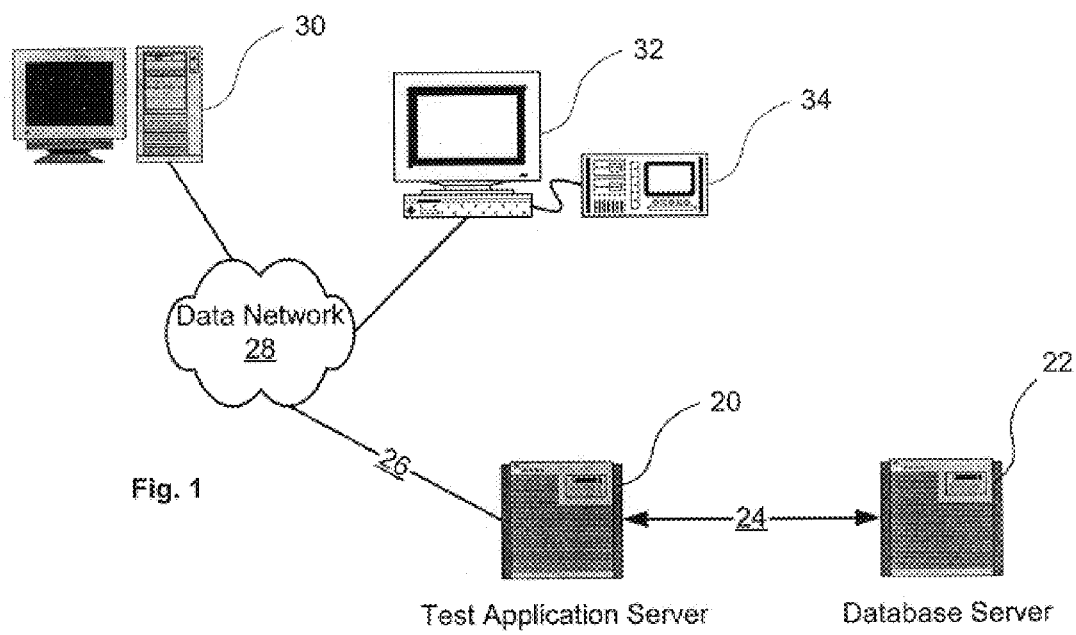
FIG. 1 illustrates an overall hardware configuration for a testing system according to the invention and its network connection.

FIG. 1 shows an overall hardware configuration for one embodiment of the invention. Test application server 20 and database server 22 are physically separate computers electronically linked by data connection 24. Test application server 20 has a data network connection 26 to data network 28, which may be a local area network or a wide area network. Note also that data connection 24 may be formed by connecting both servers 20 and 22 to data network 28.

Users access the test application server by running a web browser on a personal computer, workstation, laptop computer, etc. connected to data network 28. The computer may be completely separate from any test equipment, like computer 30, or may be interfaced with test equipment, like computer 32 and test equipment 34. In some instances, a single machine may integrate both the test equipment function and the web browser function.

Figure 2:
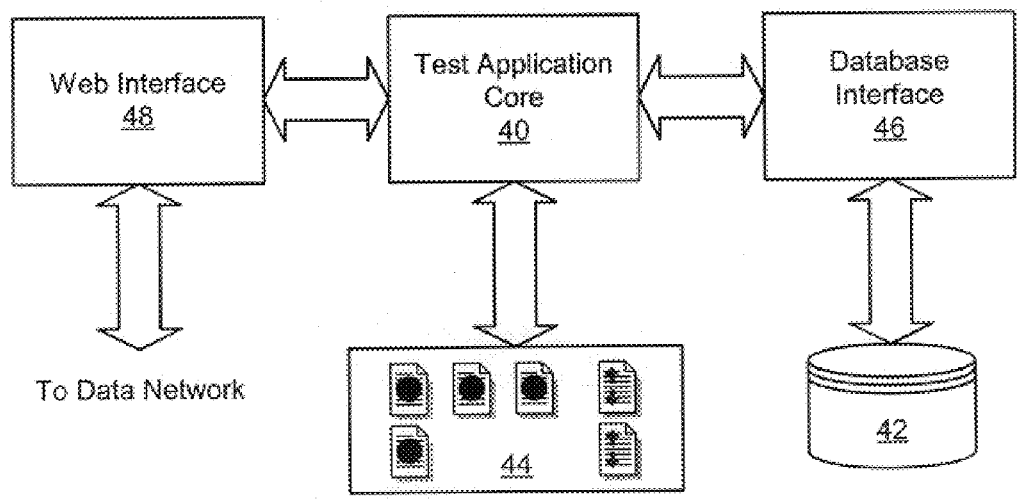
FIG. 2 shows an overall logical configuration for a testing system according to the invention.

FIG. 2 shows the logical configuration of the embodiment of FIG. 1. Application core 40 resides on the test application server and performs most of the "work" of the system with Perl scripts. Core 40 is connected to peripheral functions 46 and 48. Database interface 46 performs database extract and store operations with relational database 42, which resides on the database server. Web interface 48 (e.g., a web server) transmits web pages to users and receives uniform resource locator requests back from those users. Finally, application core 40 is connected to a template repository 44 that contains test templates and report templates. Repository 44 may, e.g., store each template as a separate file in a disk folder.

Using the Testing System

Figure 3:
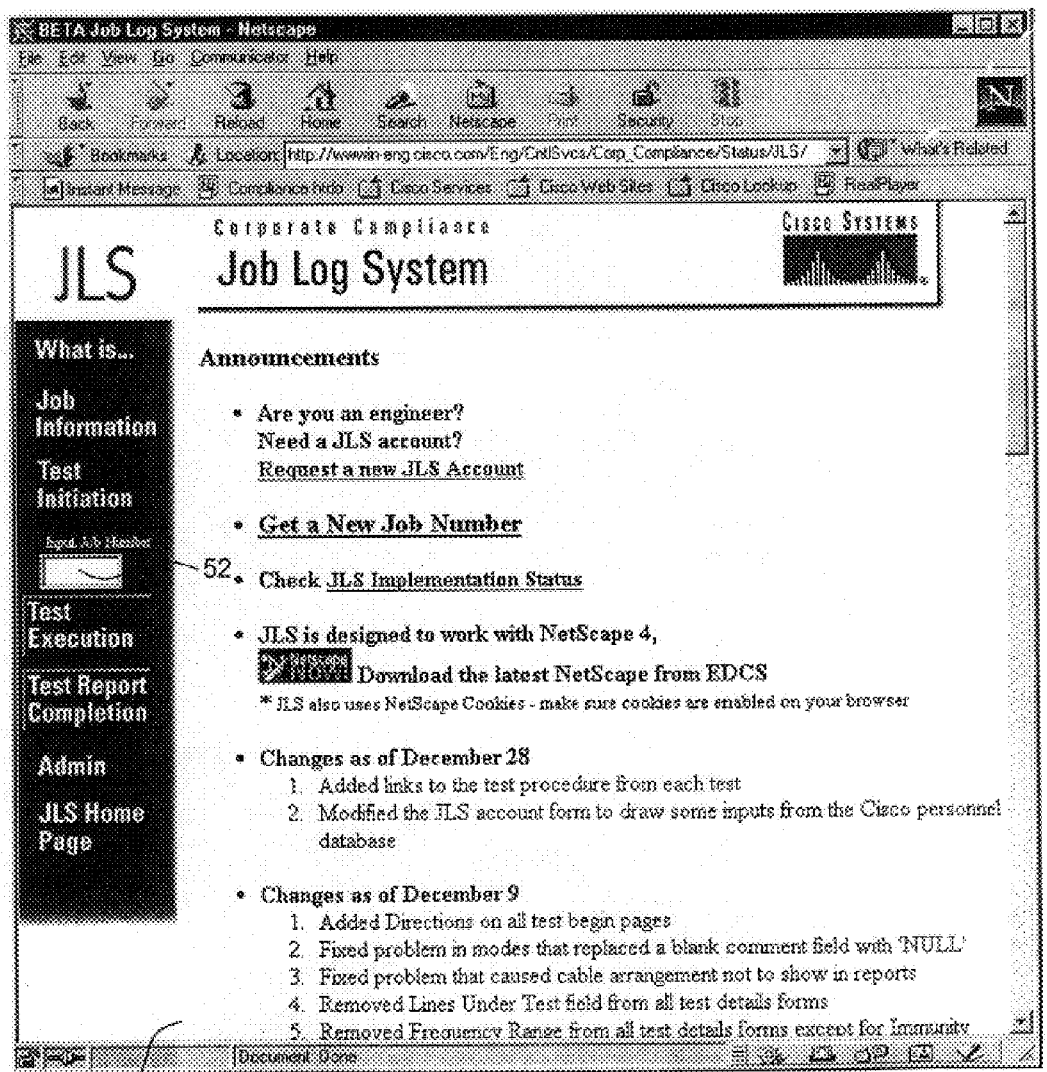
FIGS. 3, 4, 5, and 6 illustrate web browser output taken at four different points in the testing system output for an embodiment of the invention.

A user accesses a testing system home page from within their web browser in order to use the system. FIG. 3 shows a typical home page display 50 for an embodiment named the "Job Log System", or JLS. The home page contains selections for major JLS functions and links for obtaining JLS accounts and job numbers.

Preferably, access to the testing system beyond the home page is limited. Access is controlled in JLS by issuing accounts, and requiring users to login to the system before accessing test data. JLS maintains an account for each user, with the account tracking the user's name, phone/pager numbers, testing discipline, business unit, and location. JLS has the capability to verify and/or update account information by accessing a personnel database on a separate server (not shown).

Once a user has an account on JLS, they may login to the system and conduct testing. The first step in a new test program is obtaining a "job number" that can be used to identify the product under test. In JLS, a user selects the link "Get a New Job Number" from the home page displayed on their browser in order to request a new job number. The test application server receives this request, reserves an unused job number, and sends a browser form, requesting information about the job, to the user's browser. Job information includes a name for the responsible engineer, the product name, product code name, discipline of the product, the number of configurations tested, and any comments.

When a user fills in the requested job information and sends a request to the web server, the test application server receives the filled-in web form data values, parses the data values, and checks mandatory fields of the form for missing or obviously erroneous data. Assuming the data fields were filled properly, the server creates a new record in the relational database. The new record contains the job information and relates the reserved job number to the job information supplied.

Once a job has been created in the database, users can access that job, add tests and test information to that job, and view information for tests already related to that job. To perform these functions, users input a job number into the JLS home page 50 at input box 52 and select one of the links "Test Initiation", "Test Execution", or "Test Report Completion".

Test Initiation By following the link "Test Initiation", Users may complete a pre-test plan or add data common to all tests. The "Test Initiation" link calls a page with a sequential list of all the steps that must be completed prior to testing. The "New Account" function and the "New Job Number" functions from the home page are available on this page. The "Test Initiation" page also contains a link to a Test Assessment Plan that contains a series of forms used to collect and distribute the user's test planning information. This test plan information can then be critiqued by other engineers to insure the intended test setup and tests to be performed are correct and appropriate.

The last set of links on the "Test Initiation" page help the user to add samples, chassis, configurations, modes, and cable arrangements into JLS. This data is usually referenced multiple times during the testing process. Once this data is entered, the user can refer to it during testing by simply clicking a checkbox or radio button.

Test Execution

Figure 4:
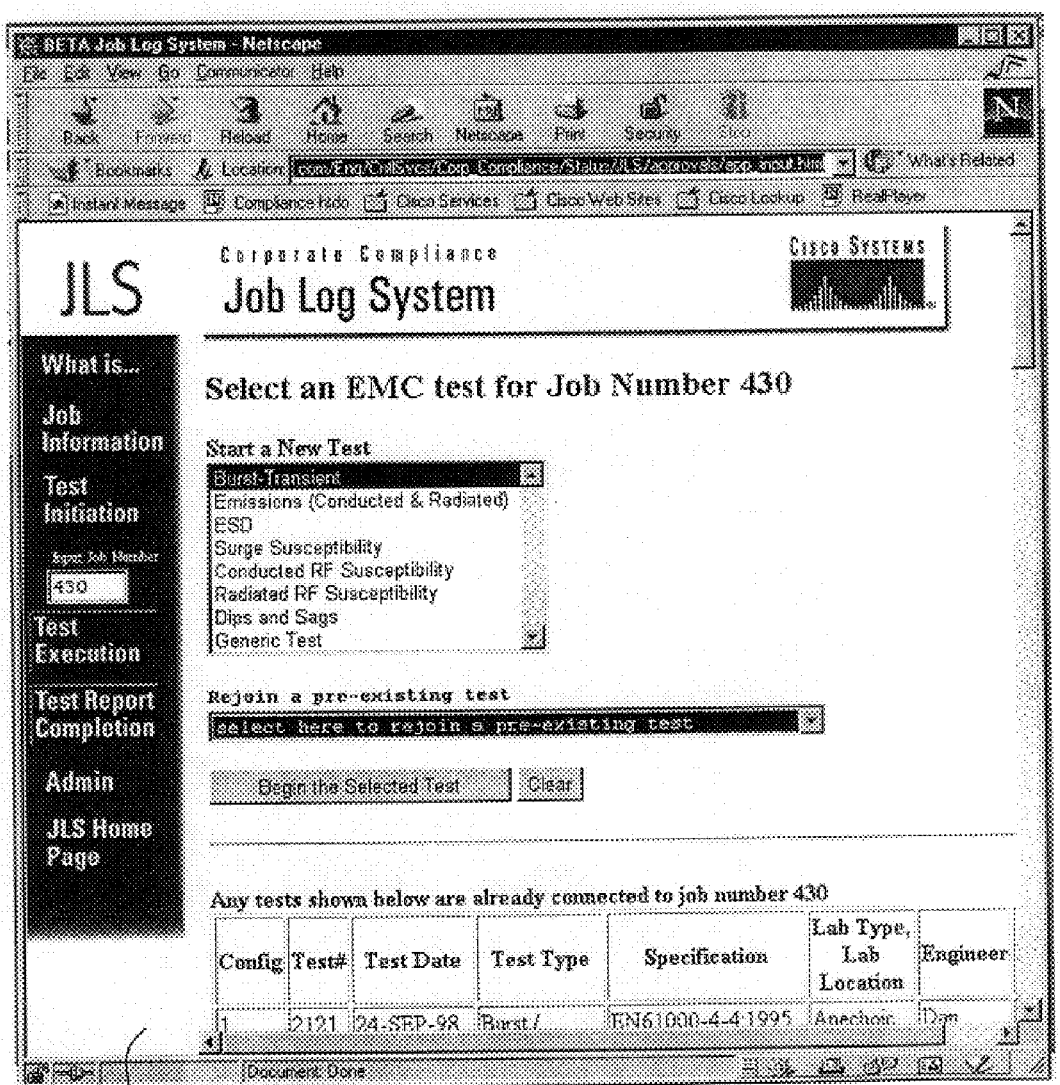

Users add tests to a job, or rejoin a pre-existing test by following the link "Test Execution". The link calls a Perl script with the job number as a parameter. The script creates a web page such as the example web page 60 shown in the browser window of FIG. 4. This web page is sent to the user's browser. It allows the user to select a new test and relate it to the job, or to rejoin an existing test related to the job. The page also displays the tests already related to that job. Once a test is selected, the user is prompted to enter information describing the test—information about samples, chassis, configurations, modes, and cable arrangements for the product under test and other equipment linked to the product to create a test environment. This information is linked to a test details number and the job number and then saved in the relational database.

Figure 5:
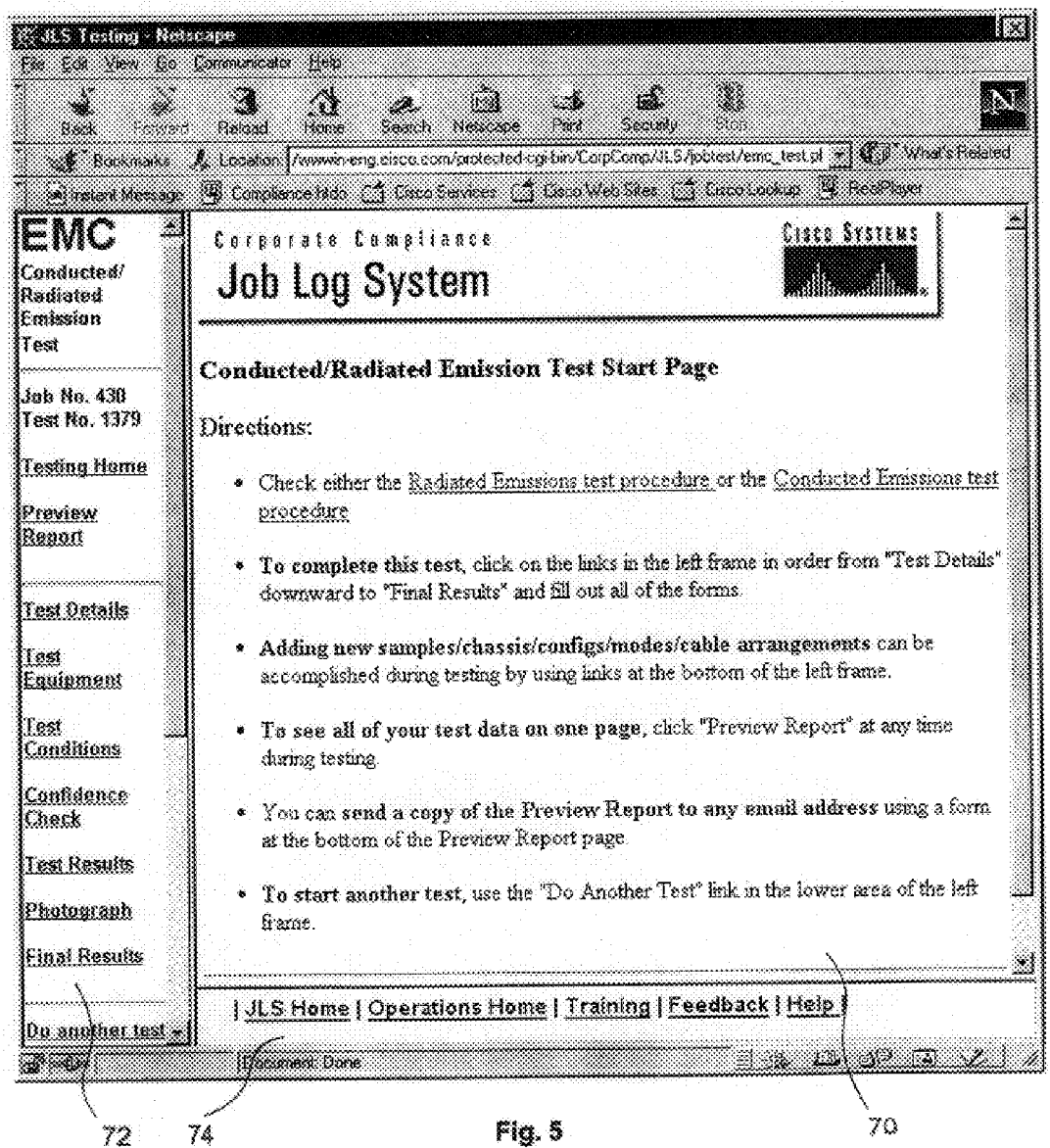

A user may also select previously initiated tests for execution. FIG. 5 shows a web page, comprising three frames 70, 72, 74, that is sent to the user for one specific test. Frame 70 contains general instructions and links to detailed test procedures. Frame 72 contains links to Perl scripts that step a user through this particular test procedure. Frame 72 also contains a link to a Perl script that allows a user to preview a report containing the test data for their test, as entered in the relational database so far.

Each Perl script linked to one of "Test Details", "Test Equipment", "Test Conditions", "Confidence Check", "Test Results", "Photograph", and "Final Results" in frame 72 creates a web browser-compatible form corresponding to a part of that test. For instance, the "Test Equipment" displays a list of available test equipment, along with check boxes that lets a user select test equipment. The Perl script generating this page may query the database as to the user's location, and only display a list of test equipment at that location.

As the user completes each form, the data entered is sent back to the test application server to be parsed and checked by another script. Note that some forms allow a user to send test data generated by an identified piece of test equipment in that equipment's result format, to be parsed by a script designed to read that format.

Test Report Completion

Figure 6:
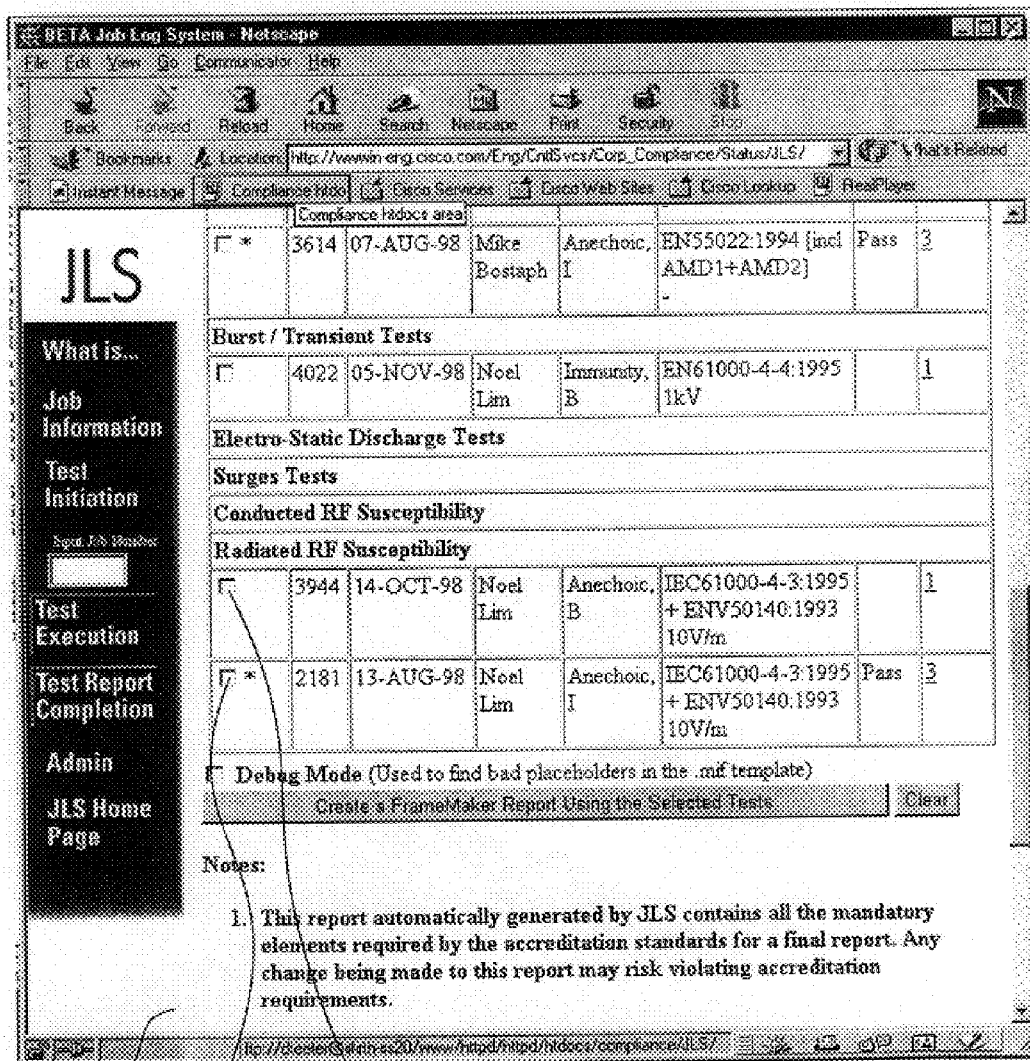

A user can request that the system create reports for a product based on the test data existing in the database. The user can access the "Test Report Completion" link from JLS, running a script that creates a browser form such as browser form 80 of FIG. 6. The form shows each test related to the job number, along with check boxes for each. A user requests a report by selecting check boxes for the desired tests, and then selecting a desired output format (form 80 shows only one format, an Adobe Framemaker Report). Other forms allow a user to choose one of multiple output formats, such as HTML or Rich Text Format (RTF). Some forms also allow a user to select one of several "looks" for the report, e.g., a first look for a domestic certification organization and a second look for a foreign certification organization, using the same test data.

Detailed System Operation

The test application server is configured to respond to user requests entered with their web browser. Server operation for a typical user request is as follows:

A user selects a link or button on a test system-generated browser form. The user's web browser sends a corresponding request to a web server application running on the test application server, i.e., step A in FIG. 7. For instance, the request may contain the uniform resource locator (URL)

http://~JLS/jobtest/emc_test.pl?emc_test_page=burst/burst_report.html&job_number=430&old_job_number=430&test_details_number=1367

The file "emc—test.pl" is a Perl script located on the test application server. The web server runs this script as step B in FIG. 7. The information after the "?" in the URL above is converted to a series of command-line parameters and passed to the script. For instance, the parameter "emc_test_page" has a value "burst/burst_report.html"—the location of an HTML template file to be used to build the requested page. The parameter "job_number" has a value "430", and the parameter "test details_number" has a value "1367"—these values identify the job and test that are to be accessed. The job number and test details number get set by a user on previous web forms, and are then passed from form to form to be automatically included in URLs.

In step C, the Perl script opens the HTML template file "burst/burst—report.html" on the test application server file system. In step D, the Perl script reads each line from the HTML template file and examines its content. If the line contains a placeholder of the style <text filling instruction>, the script replaces this placeholder with information obtained by interpreting the instruction. For instance, if instruction has the value name="test—details—number", the script substitutes the value it received on the command line (1367) for the placeholder.

Once placeholder values have been substituted if necessary, the script sends the modified line from the HTML template file to the web server application in step E. The web server sends the information back over the network to the user's web browser in step F.

Many of the placeholders in a typical test system HTML template file contain database requests. For instance, the placeholder <text filling (select product_name from job where job_number=$job_number)> has a pseudo-SQL instruction imbedded in the parentheses. The Perl script extracts this database instruction and replaces $job_ number with the value passed to the Perl script (430). The resulting SQL instruction select product_ name from job where job-number=430 is passed in step D.1 to the database server. The database server executes the SQL instruction using the test system relational database, and passes the matching data back to the Perl script in step D.2. The Perl script substitutes this matching data for the placeholder and continues with step E.

Placeholder tags can be used for a variety of functions. For example, they can be used to create HTML tables with a <table filling instruction> command. They can be used to add to the list of parameters already received in the URL request with a <variable filling instruction>command. They can be used to create a series of check boxes, such as boxes 82 and 84 in FIG. 6 or radio boxes from within a table filling command by selecting string values within an sq1 statement that produce those HTML elements. Other HTML controls can likewise be dynamically placed in a test form in similar fashion. Appendix A contains an example of a complete HTML test template illustrating several placeholder tag types. This template is used to send data to a data-storing script. Appendix B contains as an example a Perl data-storing script that interprets data sent with this template by a user, and then stores it to a database. Appendix C contains an example of a Perl template-filling script. Various low-level functions common to these and other system scripts are implemented in a function library (not shown), as is common in the computer programming art.

Although test reports can be generated in HTML format using the steps described above and illustrated in FIG. 7, formal reports typically use a document or word processing format, such as the Adobe Framemaker format, or Rich Text Format (RTF).

Figure 7:
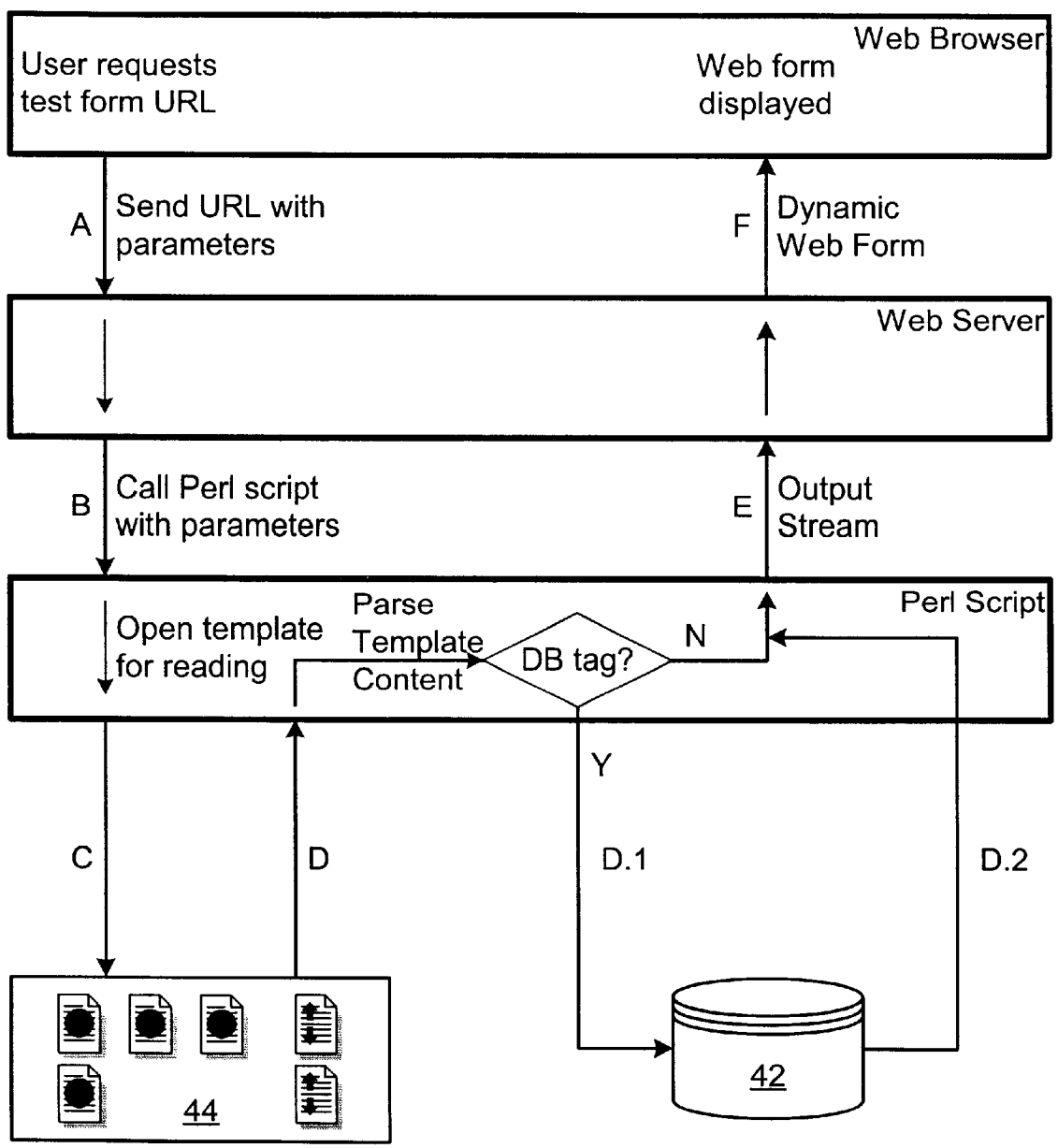
FIG. 7 illustrates the web-based dynamic test form creation process for an embodiment of the invention.

A test report in a document or word processing format can be generated in a manner similar to the one shown in FIG. 7. But instead of an HTML template, a test report template that follows the desired output format is opened. The template can contain placeholder tags similar to those in the HTML templates, although the placeholder tag delimiters may be different (e.g., "::" instead of "<" and ">").

The output stream of a Perl script generating a test report may differ from FIG. 7 also. The output stream can be directed to a file in a central file system, or it can be directed back to the user's browser (in which case the user must save it on their file system unless the browser has a plug-in supporting that format).

Test System Administration

One of the greatest advantages of the present invention is that it allows test data collection and test report generation by a large number of testers to be centrally administered in a large organization. This creates uniformity across the organization, removes inefficiencies in duplication of efforts, and allows test procedure and reporting changes to be quickly implemented. Software updates and data backups are also confined to a central location. The system also integrates helpful information with test instructions, allowing testers access to a wealth of information during the testing process. And by interpreting output generated by test equipment and uploaded through a user's web browser, the system avoids errors typically seen with hand-copied results. Finally, the system allows multiple users to access test data and generate reports, automatically, in a format of their choosing.

System administration is responsible for maintaining the user database, the test data relational database, and the test application server and its accompanying script and template files. New features are typically added to the system by modifications to the template files and the addition of new template files to cover new tests.

After reading this disclosure, one of ordinary skill in the art will recognize that many advantageous modifications to the disclosed embodiments are enabled by the concepts taught herein. For example, in addition to accessing a relational database, script files can dynamically create forms and reports using other applications, e.g., by taking tabular data from the database and feeding it to a graphing application, statistical application, or a similar program that transforms data before it is presented to a user. Other modifications to the disclosed embodiments will be obvious to those of ordinary skill in the art upon reading this disclosure, and are intended to fall within the scope of the invention as claimed.

What is claimed is:

1. A centralized product testing system comprising:
   a relational database for storing test data related to multiple products;
   a central electronic repository for storing test templates and report templates in electronic form;
   a test application server that allows a remote user operating a web browser to interface with the testing system, the server having the capability to store test data entered by the user on web-browser compatible testing forms into the relational database and the capability to dynamically generate product test reports in multiple selectable report formats, based on report templates from the central electronic repository and on selected stored test data.

2. The centralized product testing system of claim 1, wherein the test application server comprises a test form generator that dynamically produces web-browser compatible test forms based on user input supplied on other web-browser compatible forms, test templates from the central electronic repository, and test data from the relational database.

3. The centralized product testing system of claim 2, wherein the test application server comprises a test result uploader that accepts test input as indicated on one of the web-browser compatible testing forms by a user, parses the test input, and stores the parsed input in the relational database.

4. The centralized product testing system of claim 3, wherein the test result uploader accepts, as test input, results produced by an identified piece of test equipment in that equipment's result format, and parses that result format into a format compatible with the relational database.

5. The centralized product testing system of claim 4, wherein the equipment's result format is columnar text data.

6. The centralized product testing system of claim 1, wherein the test application server comprises a report generator that dynamically produces test reports based on user requests entered on web-browser forms, report templates from the template database, and test data from the relational database.

7. The centralized product testing system of claim 1, wherein the relational database resides on a database server physically separate from the test application server.

8. The centralized product testing system of claim 1, wherein the centralized electronic repository also stores information specific to pieces of test equipment that are available to perform tests.

9. The testing system of claim 1, wherein the test data related to multiple products includes test data generated by hardware testing equipment operated by a remote user.

10. A method of automating a product testing and reporting, process comprising the steps of:
    guiding a user through the testing process by dynamically generating test-specific web-browser compatible test forms that step the user through the process and sending these forms to the user's web browser;
    accepting test results from the user through the user's web browser; and
    parsing accepted test results into a relational database.

11. The method of claim 10, further comprising the step of generating a report in a selectable format using test results stored in the relational database and a centrally-stored report template.

12. The method of claim 10, wherein the step of dynamically generating test-specific web-browser compatible test forms comprises the steps of:
    accessing an electronic web form template having placeholder tags containing embedded relational database requests; and
    filling the placeholders in the template by issuing the relational database requests to the relational database.

13. The method of claim 10, wherein the sequence of the test forms generated is at least partially dependent on the answers supplied by a user in previous forms.

14. The method of claim 10, wherein the questions asked in a later form are at least partially dependent on the answers supplied by a user in previous forms.

15. The method of claim 10, comprising the step of presenting a list of test equipment to the user, from which the user selects test equipment for a desired test.

16. The method of claim 15, wherein the list of test equipment displayed to the user is a sub-list of a master list, the sub-list corresponding to equipment, from the master list, that is available at the user's location.

17. The method of claim 10, wherein the method further comprises controlling use of the system by requiring users to obtain and use an account.

18. The method of claim 17, wherein account information for a user is at least partially obtained from a separate personnel database.

19. The method of claim 10, wherein each type of product is associated to a specific job identifier within the relational database.

20. The method of claim 19, wherein each test conducted for a specific type of product is associated to that product's job identifier within the relational database.

21. The method of claim 10, wherein during the presentation of web-browser compatible test forms to a user, the user is also presented with web-browser links to detailed instructions and/or standards corresponding to those test forms.

22. The method of claim 10, wherein the step of accepting test results comprises checking results for missing or erroneous entries, and prompting a user if a problem is encountered.

23. The method of claim 10, wherein multiple centrally-stored report templates utilize the same test results from the relational database.

24. A method of automating product testing and reporting, comprising the steps of:
    gathering test data from multiple test locations to a central test application server by supplying dynamically generated web-browser test forms from the central server to testers at the test locations and accepting test data indicated on the web-browser test forms by the testers;

storing the accepted test data in a central relational database;

responding to user requests for a product test report by locating test data for that product in the central relational database and filling a report template using that test data.

25. The method of claim 24, wherein multiple testers can provide test data related to the same product to the central server, and wherein test data provided by multiple users can be combined in a common report.

* * * * *